F. H. TEEL, DEC'D.
G. C. TEEL, ADMINISTRATRIX.
MEASURING MACHINE.
APPLICATION FILED APR. 30, 1913.
1,179,977.
Patented Apr. 18, 1916.
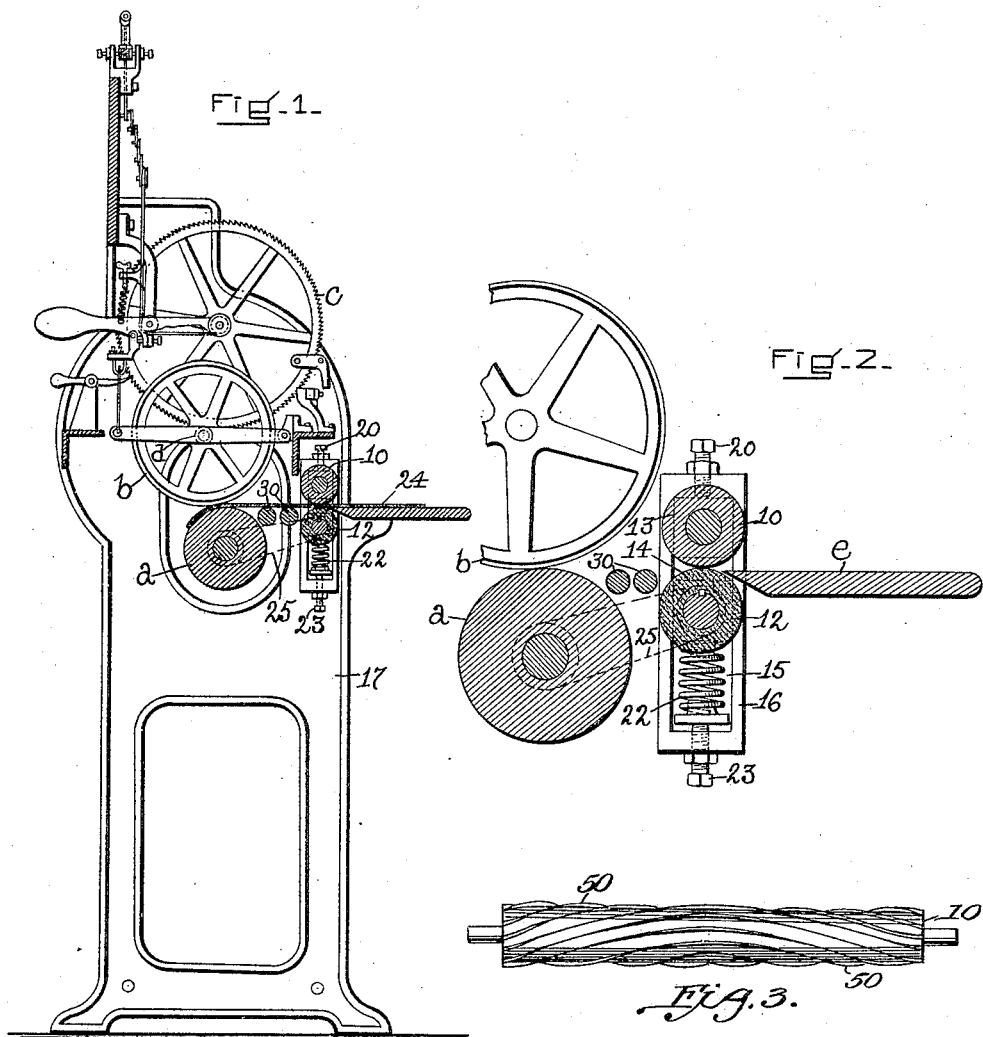

UNITED STATES PATENT OFFICE.

FRANK H. TEEL, OF SALEM, MASSACHUSETTS; GRACE CARROLL TEEL ADMINISTRATRIX OF SAID FRANK H. TEEL, DECEASED.

MEASURING-MACHINE.

1,179,977. Specification of Letters Patent. Patented Apr. 18, 1916.

Application filed April 30, 1913. Serial No. 764,534.

*To all whom it may concern:*

Be it known that I, FRANK H. TEEL, a citizen of the United States, residing in Salem, in the county of Essex and State of Massachusetts, have invented an Improvement in Measuring-Machines, of which the following description, in connection with the accompanying drawings, is a specification, like characters on the drawings representing like parts.

This invention relates to measuring machines of that class in which is employed a power operated bed roll and a plurality of measuring wheels or devices, between which and the bed roll the hide or skin to be measured is passed. The well known Sawyer measuring machine is of this type.

The present invention has for its object to increase the accuracy and output of machines of the class referred to, and to render them easier to operate.

In operation with measuring machines of the Sawyer type, the hide or skin is inserted between the bed roll and the measuring wheels and is held back by both hands of the operator to place the hide or skin under tension, and as a result the skin is oftentimes presented to the measuring wheels more or less wrinkled with consequent loss of surface measurement.

The present invention has for its object to avoid this objectionable feature of measuring machines of the class described, and provide for the hide or skin being presented to the measuring wheels under tension, in a smooth condition and in a uniform manner, whereby an increased surface measurement is obtained and a more accurate measurement of the hide or skin is effected with the machine, with less care on the part of the operator. To this end, measuring machines of the class described are provided with a feed mechanism, preferably rolls, which are located at the front of the machine between the usual table and the bed roll, and one of said feed rolls is preferably driven at a slower speed than the bed roll, so as to hold back on the hide or skin and place that portion between the bed and feed rolls under tension. One of the feed rolls is smooth to engage the grain side of the hide or skin and avoid marking or injuring the same, and the other may be smooth or provided with means for laterally spreading the hide or skin.

The particular features of the invention will be pointed out in the claims at the end of this specification.

Figure 1 is a vertical section of one form of measuring machine embodying this invention; Fig. 2, an enlarged detail to be referred to, and Fig. 3, a modified form of feed roll to be referred to.

The machine herein shown is of the Sawyer type and more particularly is that shown and described in U. S. Patent No. 931,144 dated Aug. 17, 1909, and is provided with the bed roll $a$ measuring wheels $b$ and toothed wheels $c$, which latter are driven from the measuring wheels $b$ by pinions $d$.

The bed roll is rotated by power, and the other parts of the machine are operated as fully described in the patent referred to, and do not require further explanation in the present case.

The bed roll $a$ and measuring wheels $b$ have coöperating with them two feed rolls 10, 12, which are arranged at the front of the machine between the bed roll $a$ and the usual table $e$ and are journaled at each end in boxes 13, 14, located in openings 15 in frames 16, only one of which is shown. The frames 16 are bolted or otherwise secured to the side frames 17 of the machine, only one of which is shown, and the boxes 13, 14 are adjustably supported in the frames 17, which is accomplished as herein shown by a set screw 20 engaging each of the upper boxes 13, and by a spring 22 engaging each of the boxes 14, each spring being backed up by a set screw 23 by means of which the roll 12 can be forced toward the roll 10 with different degrees of pressure.

The rolls 10, 12 constitute feed rolls for the hide or skin 24, and they may be rotated in any suitable or well known manner but preferably at a slower speed than the bed roll, and in the present instance the lower feed roll 12 is represented as driven from the bed roll by the link chain 25.

The lower feed roll 12 may be a felt roll as herein represented, with which the grain side of the hide or skin 24 is engaged, so as not to mark the grain surface, and the upper feed roll 10 may be of metal and provided with a smooth surface, as shown in Figs. 1 and 2, or it may be provided with helically arranged working edges 50 after the manner of the well known work roll of hide and leather working machines as shown in Fig. 3.

In operation, the feed rolls 10, 12 feed the hide or skin 24 to the bed roll $a$ and between the latter and the measuring wheels $b$, and as soon as the hide or skin is engaged with the bed roll and measuring wheels a drag or tension is placed on the hide or skin, and the operator is allowed to employ both hands in smoothing out the skin on the table $e$, thereby putting it in a superior condition to be measured and consequently obtaining with the machine a greater surface measurement and a more accurate one.

If desired the roll 10 may be provided with spreading edges as above described to assist the operator in smoothing out the wrinkles.

It will be observed, that by means of the feed mechanism, the work of measuring the hides or skins is materially simplified, as the operator is only required to present the hide or skin to the feed rolls, which automatically present the hide or skins in a uniform manner to the bed roll and measuring device, consequently obtaining uniform and increased surface measurement over the hand feed now commonly practised, and further enabling less skilful and experienced operators to be employed. In the present instance, the feed mechanism is shown as applied to a standard machine already built and a large number of which are now in use, and consequently a considerable space is shown between the feed rolls and the bed roll, which space may be bridged in any suitable manner to prevent the hide dropping down. The bridging of the space may be effected by one or more idle rollers 30 or in any other suitable manner. In the building of a new machine, provision would be made to eliminate this space and thus avoid the use of the intermediate support.

Claims:

1. In a measuring machine of the class described, in combination, a rotatable bed roll, rotatable measuring devices coöperating therewith, a table to support the work, feed rolls interposed between said table and bed roll and measuring devices, yielding means for automatically moving one feed roll toward the other, and means for positively rotating one of said feed rolls at a slower peripheral speed than said bed roll.

2. In a measuring machine of the class described, in combination, a rotatable bed roll, rotatable measuring devices coöperating therewith, and feed rolls coöperating with said bed roll and measuring devices, one of said feed rolls being driven at a slower speed than said bed roll.

In testimony whereof, I have signed my name to this specification in the presence of two subscribing witnesses.

FRANK H. TEEL.

Witnesses:
Jas. H. Churchill,
J. Murphy.

Copies of this patent may be obtained for five cents each, by addressing the "Commissioner of Patents, Washington, D. C."